US010399166B2

(12) United States Patent
Carter et al.

(10) Patent No.: US 10,399,166 B2
(45) Date of Patent: Sep. 3, 2019

(54) SYSTEM AND METHOD FOR MACHINING WORKPIECE OF LATTICE STRUCTURE AND ARTICLE MACHINED THEREFROM

(71) Applicant: GENERAL ELECTRIC COMPANY, Schenectady, NY (US)

(72) Inventors: William Thomas Carter, Niskayuna, NY (US); Daniel J Erno, Niskayuna, NY (US); Andrew Lee' Trimmer, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 376 days.

(21) Appl. No.: 15/196,165

(22) Filed: Jun. 29, 2016

(65) Prior Publication Data
US 2017/0120359 A1    May 4, 2017

Related U.S. Application Data

(63) Continuation-in-part of application No. 14/927,611, filed on Oct. 30, 2015, now Pat. No. 10,029,325.

(51) Int. Cl.
*B22F 3/24* (2006.01)
*B22F 5/00* (2006.01)
(Continued)

(52) U.S. Cl.
CPC ............ *B23H 3/04* (2013.01); *B22F 3/1055* (2013.01); *B22F 3/24* (2013.01); *B22F 5/009* (2013.01); *B22F 5/04* (2013.01); *B22F 5/10* (2013.01); *B23H 3/06* (2013.01); *B23H 9/001* (2013.01); *B23H 9/02* (2013.01); *B23H 9/10* (2013.01); *B23K 26/342* (2015.10); *B33Y 10/00* (2014.12);
(Continued)

(58) Field of Classification Search
CPC ... B23H 3/04; B23H 9/10; B23H 9/02; B23H 9/001; Y02P 10/295
See application file for complete search history.

(56) References Cited

U.S. PATENT DOCUMENTS

| 2,674,571 A | 4/1954 | Prosen |
| 3,978,253 A | 8/1976 | Sahm |

(Continued)

FOREIGN PATENT DOCUMENTS

| DE | 102006053586 B3 | 4/2008 |
| EP | 0089514 A1 | 9/1983 |

(Continued)

OTHER PUBLICATIONS

Invitation to Pay Additional Fees issued in connection with corresponding PCT Application No. PCT/US2017/034361 dated Aug. 3, 2017.

(Continued)

*Primary Examiner* — Nicholas A Smith
(74) *Attorney, Agent, or Firm* — Armstrong Teasdale LLP

(57) ABSTRACT

A system is configured for machining a workpiece of a lattice structure, the system includes an electrode of a lattice structure, an electrolyte supply, and a power supply. The workpiece and the electrode are intertwined with each other and electrically isolated from each other. The electrolyte supply is configured for circulating an electrolyte around and between the workpiece and the electrode. The power supply is configured for applying a voltage between the workpiece and the electrode to facilitate smoothing surfaces of the workpiece.

19 Claims, 8 Drawing Sheets

(51) Int. Cl.
*B22F 5/04* (2006.01)
*B22F 5/10* (2006.01)
*B23H 3/04* (2006.01)
*B23H 3/06* (2006.01)
*B23H 9/00* (2006.01)
*B23H 9/02* (2006.01)
*B23H 9/10* (2006.01)
*B22F 3/105* (2006.01)
*B33Y 10/00* (2015.01)
*B33Y 30/00* (2015.01)
*B33Y 40/00* (2015.01)
*B33Y 80/00* (2015.01)
*B33Y 99/00* (2015.01)
*B23K 101/00* (2006.01)
*B23K 103/04* (2006.01)
*B23K 103/14* (2006.01)
*B23K 103/18* (2006.01)
*B23K 26/342* (2014.01)

(52) U.S. Cl.
CPC ............. *B33Y 30/00* (2014.12); *B33Y 40/00* (2014.12); *B33Y 80/00* (2014.12); *B33Y 99/00* (2014.12); *B22F 2998/10* (2013.01); *B23K 2101/001* (2018.08); *B23K 2103/05* (2018.08); *B23K 2103/14* (2018.08); *B23K 2103/26* (2018.08); *Y02P 10/295* (2015.11)

(56) References Cited

U.S. PATENT DOCUMENTS

| | | |
|---|---|---|
| 4,374,009 A | 2/1983 | Chen et al. |
| 5,391,269 A | 2/1995 | Fiering et al. |
| 5,458,627 A | 10/1995 | Baranowski, Jr. et al. |
| 5,575,905 A | 11/1996 | Wistrand et al. |
| 5,589,285 A | 12/1996 | Cable et al. |
| 5,641,391 A | 6/1997 | Hunter et al. |
| 5,922,029 A | 7/1999 | Wagner et al. |
| 6,087,018 A | 7/2000 | Uchiyama |
| 6,303,015 B1 | 10/2001 | Thorpe et al. |
| 6,679,980 B1 | 1/2004 | Andreacchi |
| 6,916,409 B1 | 7/2005 | Callol et al. |
| 8,080,148 B2 | 12/2011 | Piesslinger-Schweiger et al. |
| 8,153,015 B2 | 4/2012 | Salvati et al. |
| 8,641,477 B2 | 2/2014 | Harder |
| 9,192,999 B2 | 11/2015 | Carter et al. |
| 2002/0142191 A1 | 10/2002 | Sakai et al. |
| 2003/0031983 A1 | 2/2003 | Kotte et al. |
| 2003/0060873 A1 | 3/2003 | Gertner et al. |
| 2003/0079910 A1 | 5/2003 | Kosowsky |
| 2003/0136685 A1 | 7/2003 | Stoller et al. |
| 2003/0234181 A1 | 12/2003 | Palumbo et al. |
| 2004/0055888 A1 | 3/2004 | Wikiel et al. |
| 2004/0233351 A1 | 11/2004 | Lazarev |
| 2005/0082259 A1 | 4/2005 | Horne |
| 2005/0119743 A1 | 6/2005 | Pickford et al. |
| 2005/0145508 A1 | 7/2005 | Larsen et al. |
| 2005/0150775 A1 | 7/2005 | Zhang et al. |
| 2005/0183958 A1 | 8/2005 | Wikiel et al. |
| 2005/0258047 A1 | 11/2005 | Christensen et al. |
| 2006/0051397 A1 | 3/2006 | Maier et al. |
| 2006/0115512 A1 | 6/2006 | Peacock, III et al. |
| 2006/0124472 A1 | 6/2006 | Rokicki |
| 2006/0166474 A1 | 7/2006 | Vereecken et al. |
| 2006/0278535 A1 | 12/2006 | Fairbourn |
| 2007/0034528 A1 | 2/2007 | Diaz |
| 2007/0073390 A1 | 3/2007 | Lee et al. |
| 2007/0256938 A1 | 11/2007 | Fruth |
| 2008/0181542 A1 | 7/2008 | Gomyo |
| 2008/0199767 A1 | 8/2008 | Sexton et al. |
| 2008/0230397 A1 | 9/2008 | Fecher et al. |
| 2008/0233271 A1 | 9/2008 | Haring |
| 2009/0204213 A1 | 8/2009 | Liao et al. |
| 2009/0266791 A1 | 10/2009 | Yang et al. |
| 2011/0062031 A1 | 3/2011 | Wulf |
| 2011/0178590 A1 | 7/2011 | Zucker |
| 2011/0226632 A1 | 9/2011 | Cole et al. |
| 2011/0235212 A1 | 9/2011 | Sakurai et al. |
| 2011/0274732 A1 | 11/2011 | Srivastav et al. |
| 2011/0287223 A1 | 11/2011 | Victor et al. |
| 2011/0303553 A1 | 12/2011 | Inman et al. |
| 2012/0085652 A1 | 4/2012 | Omanovic et al. |
| 2012/0109285 A1 | 5/2012 | Garza |
| 2012/0114868 A1 | 5/2012 | Bunker et al. |
| 2015/0001093 A1 | 1/2015 | Carter et al. |
| 2015/0014281 A1 | 1/2015 | Trimmer et al. |
| 2015/0060403 A1 | 3/2015 | Carter et al. |
| 2015/0144496 A1 | 5/2015 | Morris et al. |
| 2016/0052057 A1 | 2/2016 | Xu |
| 2016/0151829 A1 | 6/2016 | Propheter-Hinckley et al. |

FOREIGN PATENT DOCUMENTS

| | | |
|---|---|---|
| EP | 1114883 A1 | 7/2001 |
| EP | 1641500 B1 | 5/2008 |
| GB | 1252691 A | 11/1971 |
| GB | 1343162 A | 1/1974 |
| GB | 1395324 A | 5/1975 |
| GB | 2393969 A | 4/2004 |
| JP | 56152999 A | 11/1981 |
| WO | 0131085 A2 | 5/2001 |
| WO | 03039609 A1 | 5/2003 |
| WO | 2008017156 A1 | 2/2008 |
| WO | 2008038293 A2 | 4/2008 |
| WO | 2010139051 A1 | 12/2010 |
| WO | 2012000653 A2 | 1/2012 |
| WO | 2012083442 A1 | 6/2012 |

OTHER PUBLICATIONS

International Search Report and Written Opinion issued in connection with corresponding PCT Application No. PCT/US2017/034361 dated Oct. 2, 2017.

Yang et al., "Surface treatment of Ti6Al4V parts made by powder bed fusion additive manufacturing processes using electropolishing", pp. 268-277.

SYSTEM AND METHOD FOR MACHINING WORKPIECE OF LATTICE STRUCTURE AND ARTICLE MACHINED THEREFROM

CROSS REFERENCE TO RELATED APPLICATIONS

This application is a continuation-in-part of U.S. patent application Ser. No. 14/927,611, entitled "METHODS AND SYSTEMS FOR ELECTROCHEMICAL MACHINING OF AN ADDITIVELY MANUFACTURED COMPONENT", filed on Oct. 30, 2015, which is incorporated herein by reference.

BACKGROUND

Embodiments of the present invention relate generally to a system and a method for machining a workpiece of lattice structure and an article machined therefrom.

Additive manufacturing is a technology that enables "3D-printing" of workpieces of various materials including metals and plastics. In additive manufacturing, a workpiece is built in a layer-by-layer manner. For example, each layer of the workpiece may be manufactured by leveling powder and selectively fusing the powder using a high-power laser. After each layer, more powder is added and the laser forms the next layer, simultaneously fusing it to the prior layers. The workpiece typically has a rough surface that is improved via post-build process such as grit blasting, grinding, sanding, or polishing to meet industry standards. However, these post-build processes can improve surface finish of the workpiece, but cause unwanted thermal or mechanical stresses being transferred to the workpiece. Thus, surface finish of the workpiece still needs to be improved to mitigate workpiece failures due to conditions such as fracture, low-cycle fatigue, high-cycle fatigue, and coking.

Furthermore, the workpiece typically have a bulk structure, for example the workpiece is a solid-body workpiece. That is, sometimes, the workpiece is too heavy to meet industry requirements.

The aforementioned issues also exist in the workpiece that is not formed by additive manufacturing.

Therefore, there is a need for an improved system and method to address at least some of the aforementioned issues.

BRIEF DESCRIPTION

In accordance with one exemplary embodiment disclosed herein, a system for machining a workpiece of a lattice structure is provided, the system includes an electrode of a lattice structure, an electrolyte supply, and a power supply. The workpiece and the electrode are intertwined with each other and electrically isolated from each other. The electrolyte supply is configured for circulating an electrolyte around and between the workpiece and the electrode. The power supply is configured for applying a voltage between the workpiece and the electrode to facilitate smoothing surfaces of the workpiece.

In accordance with another exemplary embodiment disclosed herein, a method for machining a workpiece of a lattice structure is provided and includes: providing an electrode of a lattice structure to be intertwined with the workpiece and be electrically isolated from the workpiece; circulating an electrolyte around and between the workpiece and the electrode; and applying a voltage between the workpiece and the electrode to facilitate smoothing surfaces of the workpiece.

In accordance with yet another exemplary embodiment disclosed herein, an article is provided and machined from a workpiece of a lattice structure by a process. The process includes: providing an electrode of a lattice structure to be intertwined with the workpiece and be electrically isolated from the workpiece; circulating an electrolyte around and between the workpiece and the electrode; and applying a voltage between the workpiece and the electrode to facilitate smoothing surfaces of the workpiece.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items; and terms "bottom" and/or "top", unless otherwise noted, are merely used for convenience of description, and are not limited to any one position or spatial orientation. Moreover, the term "or" is meant to be inclusive and mean either any, several, or all of the listed items. The use of "including", "comprising", or "having"

and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The term "controller" may include either a single component or a plurality of components, which are either active and/or passive components and may be optionally connected or otherwise coupled together to provide the described function.

Figure 1:
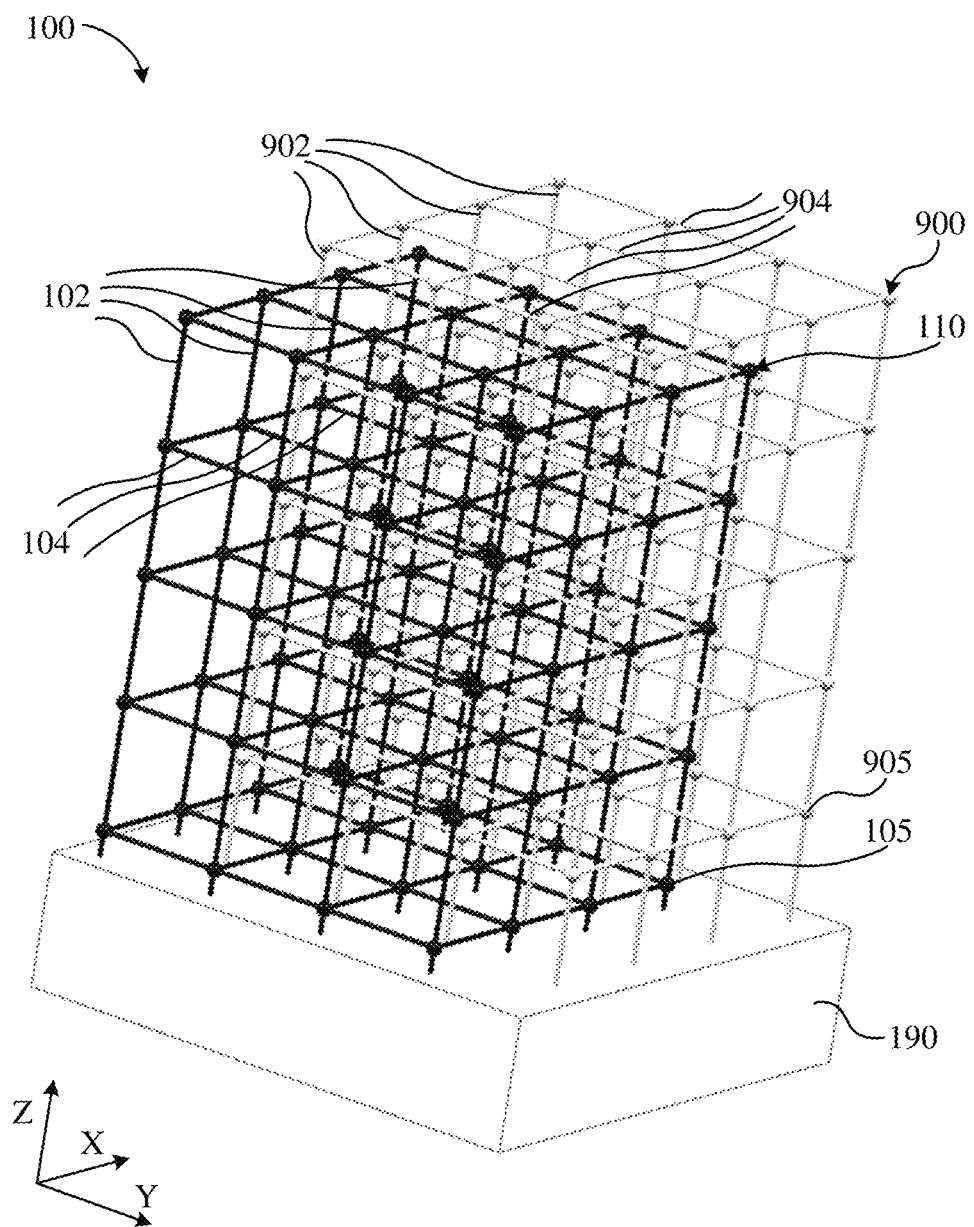
FIG. 1 is a perspective view of a workpiece of a lattice structure and an electrode.

FIG. 1 is a perspective view of a workpiece 100 of a lattice structure and an electrode 900. The workpiece 100 includes a body portion 110 and a build plate 190. The body portion 110 is coupled to the build plate 190. The electrode 900 is also coupled to the build plate 190. The build plate 190 may be electrically conductive for example.

Figure 2:
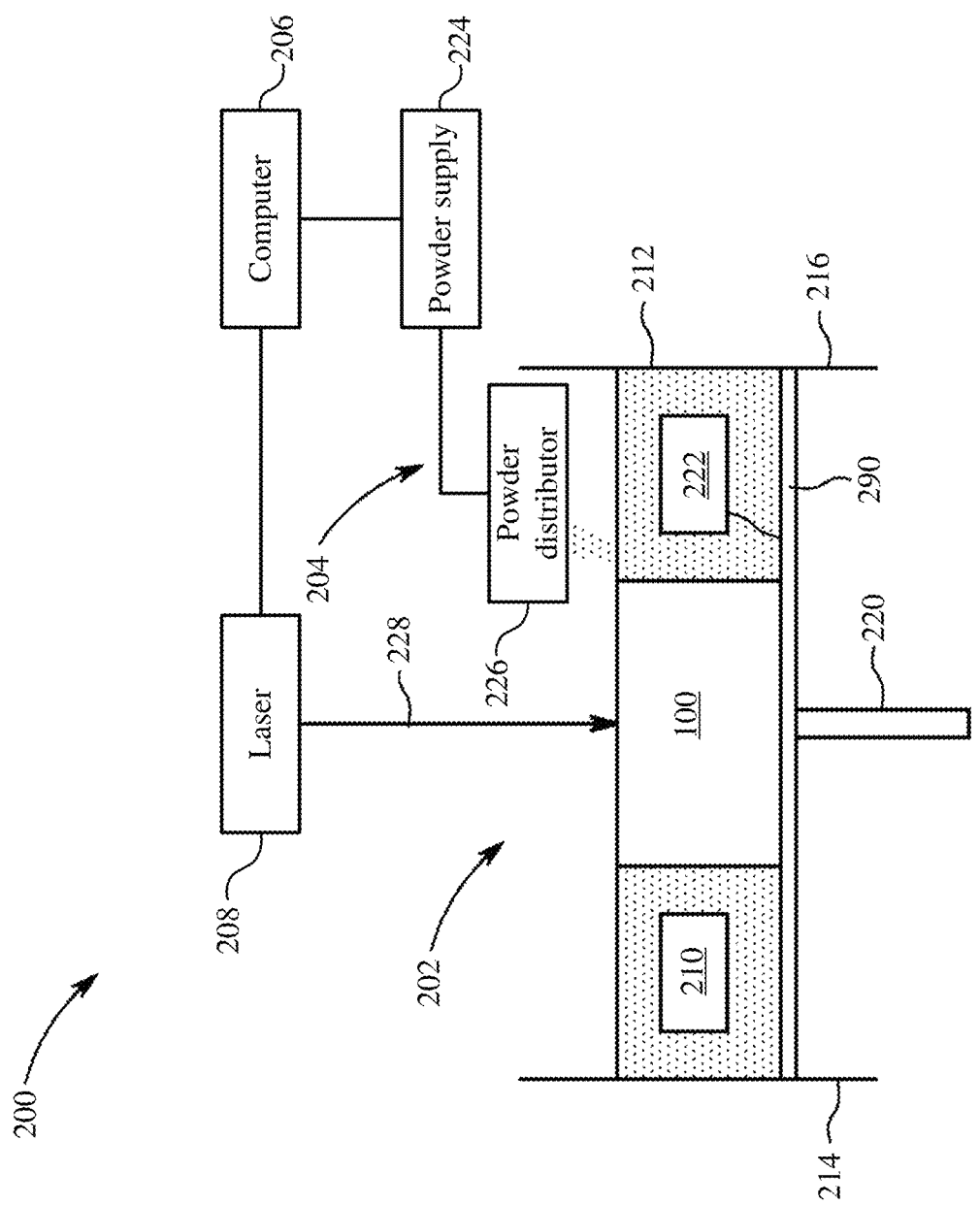
FIG. 2 is a schematic view of an additive manufacturing system for manufacturing the workpiece and the electrode of FIG. 1.

In the embodiment, the body portion 110 and the electrode 900 may be formed on the build plate 190 by an additive manufacturing system 200 of FIG. 2 for example, intertwined with each other and electrically isolated from each other. In detail, the body portion 110 and the electrode 900 are intertwined with each other but without contacting each other. In other embodiments, the body portion 110 and the electrode 900 may be formed by other methods rather than the additive manufacturing method.

In the embodiment, the workpiece 100 may be a gas turbine fuel nozzle or a turbine rotor blade to be machined for example. In other embodiments, the workpiece 100 may be any suitable workpiece that is formed by the additive manufacturing system 200 of FIG. 2.

In one embodiment, the body portion 110 and the electrode 900 may be simultaneously formed on the build plate 190 by the additive manufacturing system 200 of FIG. 2 for example.

The body portion 110 has a lattice structure. In a non-limiting example, the body portion 110 includes a plurality of spaced apart lateral rods 102 and a plurality of spaced apart longitudinal rods 104. The spaced apart lateral rods 102 and the spaced apart longitudinal rods 104 are interconnected on nodal points 105 to define the lattice structure.

The electrode 900 has a lattice structure. In a non-limiting example, the electrode 900 includes a plurality of spaced apart lateral rods 902 and a plurality of spaced apart longitudinal rods 904. The spaced apart lateral rods 902 and the spaced apart longitudinal rods 904 are interconnected on nodal points 905 to define the lattice structure.

The lattice structure of the body portion 110 is parallel to the lattice structure of the electrode 900 along a longitudinal direction x that is perpendicular to a lateral direction Y and a vertical direction Z.

In the embodiment, the lattice structure of the electrode 900 is the same as the lattice structure of the body portion 110. In other embodiments, the lattice structure of the electrode 900 may be different from the lattice structure of the body portion 110.

FIG. 2 is a schematic view of an additive manufacturing system 200 for manufacturing the workpiece 100 and the electrode 900 of FIG. 1. A model of the workpiece 100 is designed using computer aided design (CAD) software, such that the model includes 3-dimensional coordinates of the workpiece 100. Generally, additive manufacturing provides fast material processing time, innovative joining techniques, and less concern for geometric constraints. In one embodiment, direct metal laser melting (DMLM) or direct metal laser sintering (DMLS) is used to manufacture the workpiece 100. DMLM is a laser-based rapid prototyping and tooling process by which the complex workpiece may be directly produced by precision melting and solidification of metal powder into successive deposit layer of larger structures, each deposit layer corresponding to a cross-sectional layer of the 3-dimensional workpiece 100.

The additive manufacturing system 200 includes an additive manufacturing apparatus 202, a powder delivery apparatus 204, a computer 206, and a laser 208 that functions to manufacture the workpiece 100 from a metal powder 210.

The additive manufacturing apparatus 202 is a DMLM apparatus. Alternatively, the additive manufacturing apparatus 202 may be any additive manufacturing apparatus that facilitates manufacturing the workpiece 100 as described herein. The additive manufacturing apparatus 202 includes a powder bed 212 having a first side wall 214 and an opposing second side wall 216. The additive manufacturing apparatus 202 includes a build plate 290 that extends at least partially between the first and second side walls 214 and 216 and that facilitates supporting the workpiece 100 during manufacturing. In one embodiment, the build plate 290 may be the build plate 190 of FIG. 1 for example.

A piston 220 is coupled to the build plate 290 and is capable of being moved between the first and second side walls 214 and 216 of the powder bed 212 along a vertical direction. The piston 220 is adjusted such that a top surface of the build plate 290 defines a working surface 222. The powder delivery apparatus 204 includes a powder supply 224 coupled to a powder distributor 226 that transfers the powder 210 from the powder supply 224 to the additive manufacturing apparatus 202. In the exemplary embodiment, the powder distributor 226 is a wiper configured to distribute an even layer of the powder 210 into the powder bed 212. Alternatively, the powder distributor 226 may be a spray nozzle that transfers the powder 210 from the powder supply 224 to the powder bed 212. Generally, the powder distributor 226 may be any device that transfers powder 210 from the powder supply 224 to the powder bed 212 such that the system 200 operates as described herein.

During operation, the powder distributor 226 distributes a first layer of the powder 210 from the powder supply 224 onto the working surface 222 of the build plate 290. The laser 208 directs a laser beam 228, which is guided by the computer 206, onto the working surface 222 of the build plate 290 to selectively fuse the powder 210 into a cross-sectional layer of the workpiece 100. More specifically, the laser beam 228 selectively fuses the powder 210 into a top surface of the build plate 190 (shown in FIG. 1) by rapidly melting the powder 210 particles together to form a solid. As the laser beam 228 continues to form a portion of each layer, heat is conducted away from the previously melted area, thereby leading to rapid cooling and solidification. In the exemplary embodiment, the computer 206 controls the laser beam 228 such that each layer of the powder 210 will include unsintered powder and sintered powder that forms at least a portion of the cross-sectional layer of the workpiece 100.

In the exemplary embodiment, upon completion of the cross-sectional layer of the workpiece 100, the build plate 290 is lowered by the piston 220 and the powder distributor 226 distributes an additional layer of the powder 210 into the powder bed 212. The laser beam 228 is again controlled by the computer 206 to selectively form another cross-sectional layer of the workpiece 100. This process is continued as successive cross-sectional layers are built into the workpiece 100.

Accordingly, the workpiece 100 is manufactured beginning at a bottom of the body portion 110 such that a respective cross-sectional layer of the workpiece 100 may include at least a portion of the body portion 110 and the electrode 900. More specifically, the additive manufacturing apparatus 202 may facilitate simultaneously forming the body portion 110 and the electrode 900 for example, such that the electrode 900 is intertwined with the body portion 110 of the workpiece 100 and is electrically isolated from the body portion 110 of the workpiece 100. When the additive manufacturing process is completed, any unsintered powder 210 is removed through the lattice structure formed by the workpiece 100 and the workpiece 100 is removed from the powder bed 212 to facilitate further processing.

In the exemplary embodiment, the workpiece 100 may be manufactured from the metal powder 210 comprising a superalloy for example, a cobalt-based superalloy, such as cobalt-chrome, or a nickel-based superalloy, as well as stainless steels, titanium, chromium, or other alloys, or a combination thereof. Cobalt and nickel-based superalloys are commonly used to manufacture gas turbine workpieces because of the high strength required for long periods of service at the high temperature condition of turbine operation. The metal powder 210 may be selected for enhanced strength, durability, and long periods of service, particularly at high temperatures.

In other embodiments, the workpiece 100 may be manufactured from the metal powder 210 and a plastic powder (not shown) using the additive manufacturing system 200, surfaces of the workpiece 100 are manufactured from the metal powder 210.

After manufacturing, the workpiece 100 may have a relatively high surface roughness, further processing of the workpiece 100 may be required. Such post-manufacturing process may include, for example, stress relief or hardening heat treatments, peening, polishing, hot isostatic pressing (HIP), or ECM. In some embodiments, one or more of the post-manufacturing process listed above are not necessary and may be omitted. In the exemplary embodiment, the workpiece 100 may include substantial surface roughness caused by the additive manufacturing process. Specifically, surfaces of the workpiece 100 may have a relatively high roughness and may not be suitable for use without further processing to facilitate smoothing surfaces of the workpiece 100.

Figure 3:
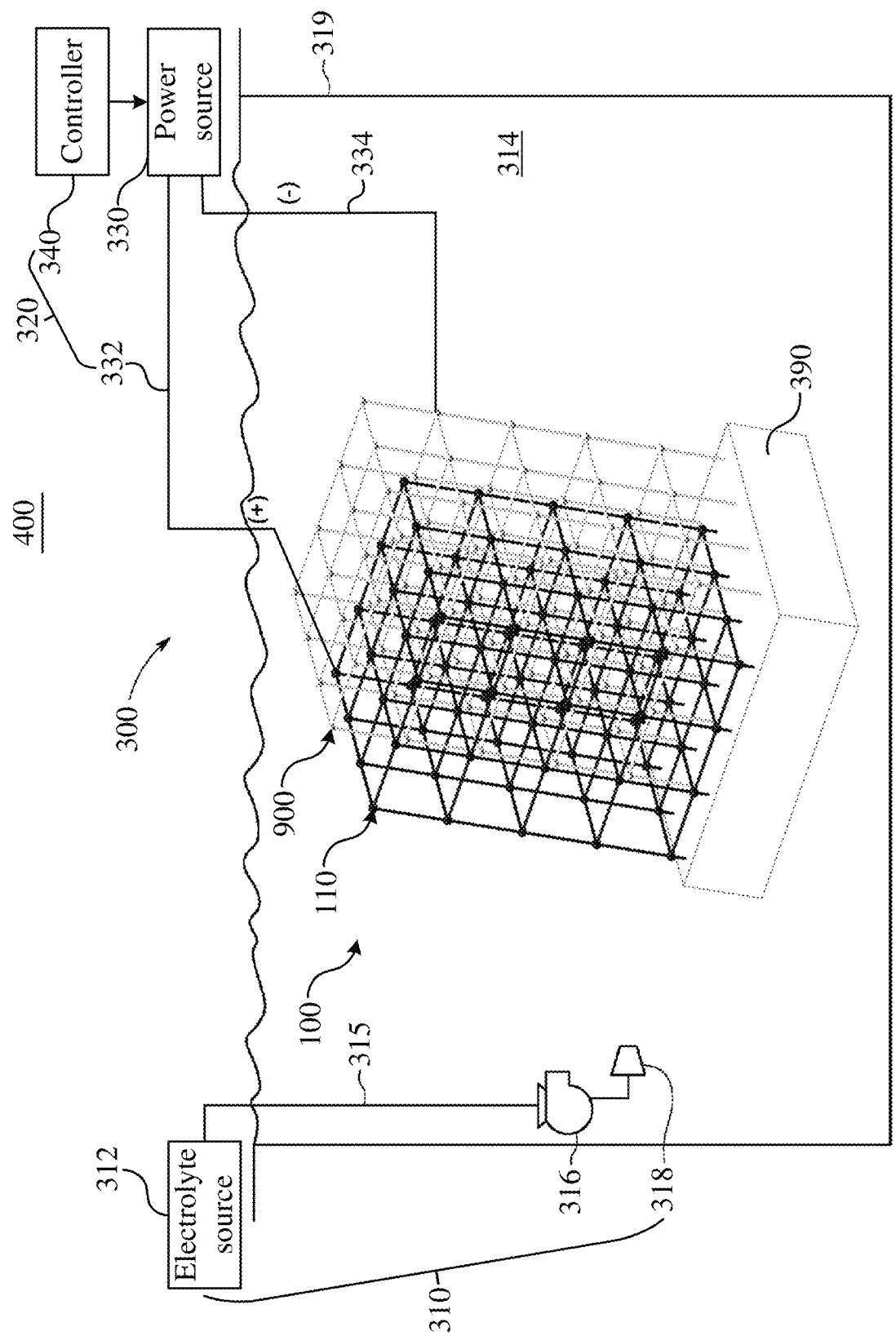
FIG. 3 is a schematic view of the electrode and an electrochemical machining (ECM) device of a system and the workpiece of FIG. 1 in accordance with a first exemplary embodiment.

FIG. 3 is a schematic view of the electrode 900 and an electrochemical machining (ECM) device 300 of a system 400 and the workpiece 100 of FIG. 1 in accordance with a first exemplary embodiment.

In the exemplary embodiment, prior to ECM, the body portion 110 must be electrically isolated from the electrode 900. To facilitate such electrical isolation, the build plate 190 of FIG. 1 is replaced with an electrically non-conductive support plate 390. The body portion 110 and the electrode 900 are coupled to the support plate 390.

Electrically non-conductive support plate 390 facilitates isolating the body portion 110 from the electrode 900 such that an electric current applied within the ECM device 300 does not flow through the body portion 110 to the electrode 900. In a non-limiting embodiment, firstly the build plate 190 is removed from the body portion 110 and the electrode 900 using conventional machining methods, secondly the build plate 190 is covered with an electrically non-conductive material, such as but not limited to an epoxy, to form an epoxy plate; then the build plate 190 is separated from the epoxy plate using conventional machining methods, finally the epoxy plate is coupled to the body portion 110 and the electrode 900 to form the support plate 390, therefore the build plate 190 is replaced with the support plate 390.

The ECM device 300 includes an electrolyte supply 310 and a power supply 320. The electrolyte supply 310 includes an electrolyte source 312, a conduit 315, a pump 316, and a nozzle 318. In the embodiment, the electrolyte source 312 may be a storage tank, or the like for example.

The power supply 320 includes a power source 330, a positive lead 332, a negative lead 334, and a controller 340. The power source 330 is configured to apply a voltage in the form of a pulsed voltage (and more particularly, a bipolar pulsed voltage) between the workpiece 100 and the electrode 900 to electrochemically remove material from the workpiece 100 such that surfaces of the workpiece 100 are smoothed. The application of the pulsed voltage to the electrode 900 and to the workpiece 100 electrochemically removes a predetermined amount of material from the surfaces of the workpiece 100. The bipolar, pulsed voltage is applied between the electrode 900 and the workpiece 100 using the power source 330. More specifically, the positive lead 332 is electrically coupled to the body portion 110 of the workpiece 100 and the negative lead 334 is electrically coupled to the electrode 900, so as to provide the pulsed voltage to the electrode 900 and to the body portion 110. In the exemplary embodiment, the controller 340 is electrically coupled to the bipolar power source 330 and is configured to perform pulse control. The controller 340 controls the pulse duration, frequency and magnitude of the pulsed voltage supplied to the electrode 900 and the workpiece 100.

The electrolyte supply 310 includes a container 319 configured to contain an electrolyte 314 of the electrolyte source 312. The electrolyte 314 comprises a charge-carrying fluid, such as but not limited to phosphoric acid. The container 319 is sized sufficiently to receive the electrolyte 314, the workpiece 100, the electrode 900, and the leads 332 and 334.

The electrolyte 314 is circulated around and between the workpiece 100 and the electrode 900. In the exemplary embodiment, the electrolyte 314 is stored in the electrolyte source 312. The electrolyte 314 may be circulated around and between the workpiece 100 and the electrode 900 by the nozzle 318 of the pump 316 for example. The pump 316 is coupled to the electrolyte source 312 via the conduit 315.

The voltage, in the form of the pulsed voltage for example, is applied between the workpiece 100 and the electrode 900, so as to cause at least partial dissolution of the surfaces of the workpiece 100. Such dissolution results in smoothing of the surfaces of the workpiece 100 to provide a high-quality surface finish. The electrolyte 314 carries the metal hydroxide formed during ECM away from the workpiece 100. As described above, the workpiece 100 may be a fuel nozzle or any number of hot gas path turbine workpieces and requires a high-quality smooth surface for operation. Compared to conventional machining methods, such as grit blasting, grinding, sanding, or polishing, the power source 330 of the ECM device 300 applies the voltage between the workpiece 100 and the electrode 900 to facilitate smoothing the workpiece 100 without unwanted thermal or mechanical stresses being transferred to the workpiece 100.

In one exemplary embodiment, after roughness of the surfaces of the workpiece 100 has been removed using the ECM device 300, it may be beneficial to remove the electrode 900 from the workpiece 100. In a specific embodiment, a polarity of the voltage applied between the workpiece 100 and the electrode 900 is reversed to at least partially dissolve the electrode 900 or to break the electrode 900 into parts that can be removed mechanically, such that the electrode 900 is removed from the workpiece 100. The time required to remove the lattice structure of the electrode 900 may be reduced through appropriate design. For example, the lattice structure of the electrode 900 may be thin or may have thin regions for desired dissolution. In this case, the body portion 110 is left in place as part of the workpiece 100. When removing the electrode 900, it is necessary to control a dissolution rate such that locations within the electrode 900 are not electrically isolated from each other before complete dissolution, a dimension of the electrode 900 may be controlled to meet this requirement.

In another exemplary embodiment, after roughness of the surfaces of the workpiece 100 has been removed using the ECM device 300, it may be beneficial to reverse roles of the workpiece 100 and the electrode 900 so as to facilitate smoothing surfaces of the electrode 900. In a specific embodiment, a polarity of the voltage applied between the workpiece 100 and the electrode 900 is reversed to facilitate smoothing the surfaces of the electrode 900. In one embodiment, the polarity of the voltage is switched at a determined high frequency; in detail, the polarity of the voltage may be switched every 5 seconds for a period of time ranging from 0.1 to 0.5 second for example. In this case, both the body portion 110 and the electrode 900 are left in place as part of the workpiece 100.

Figure 4:
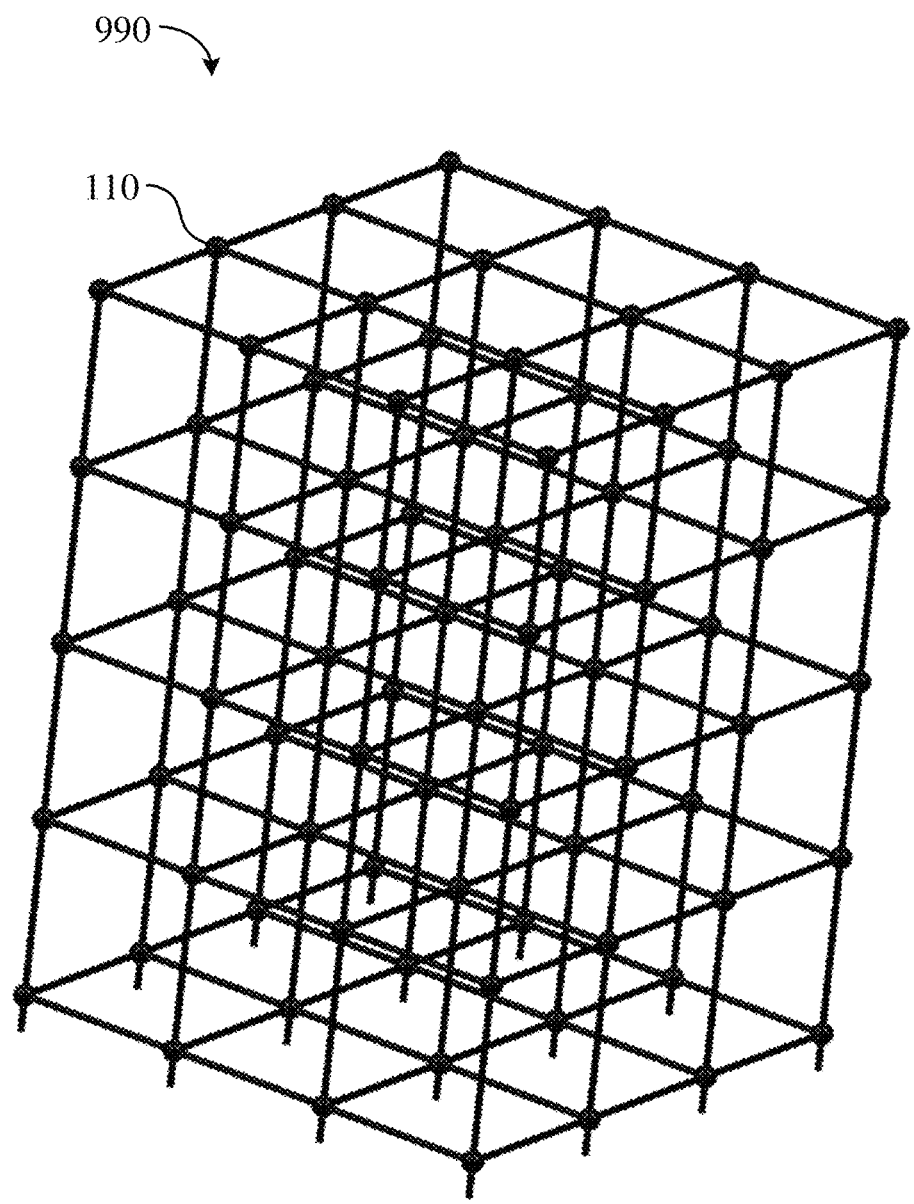
FIG. 4 is a perspective view of an article after machining from the workpiece of FIG. 3 by the ECM device of FIG. 3.

FIG. 4 is a perspective view of an article 990 after machining from the workpiece 100 of FIG. 3 by the ECM device 300 of FIG. 3. In the article 990 of FIG. 4, the roughness has been removed from the surfaces of the workpiece 100 by the ECM device 300 of FIG. 3; the electrode 900, as shown in FIGS. 1 and 3, has been removed from the workpiece 100 as described above; the build plate 390, as shown in FIG. 3, has been machined away from the workpiece 100.

Figure 5:
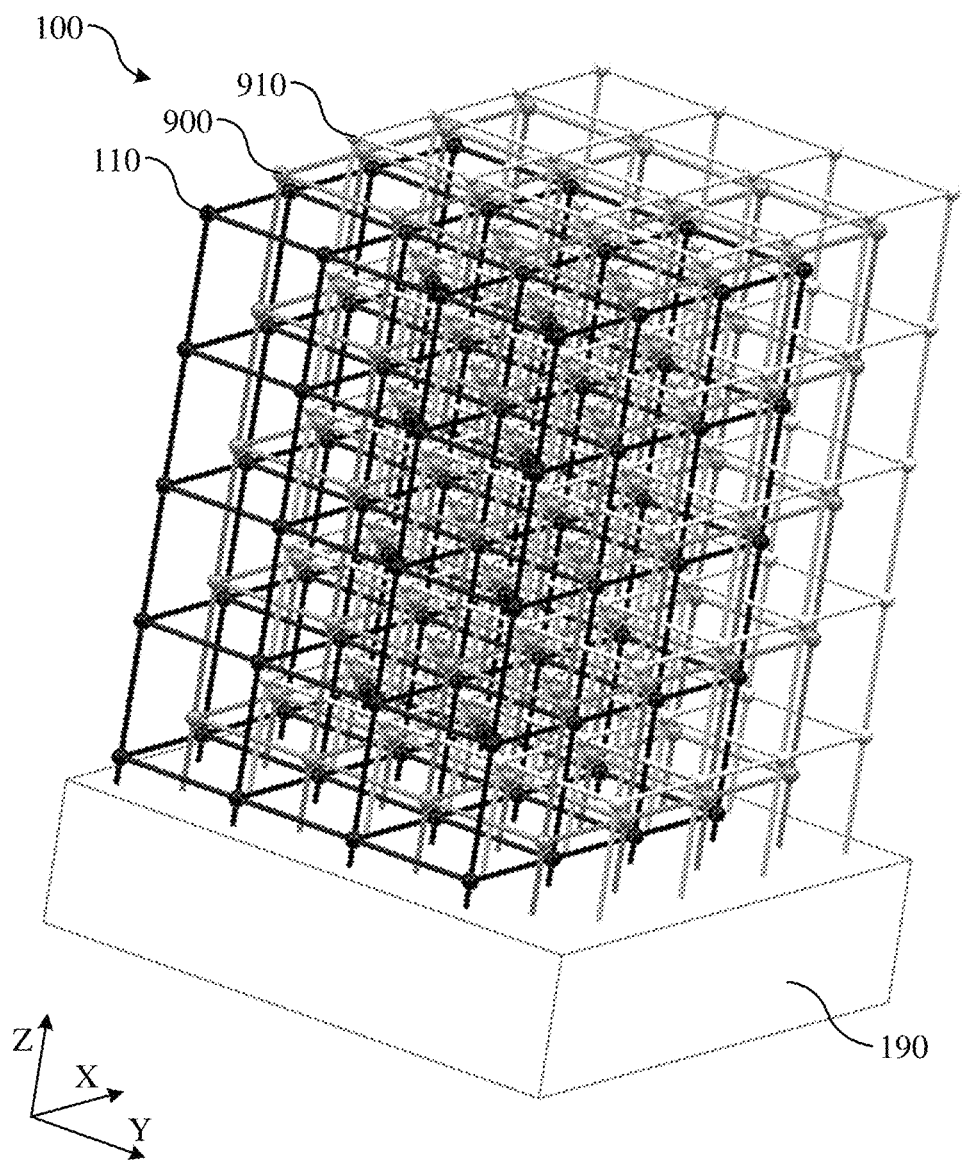
FIG. 5 is a perspective view of the workpiece and two electrodes.

FIG. 5 is a perspective view of the workpiece 100 and two electrodes 900, 910. The body portion 110 and two electrodes 900, 910 are coupled to the build plate 190. The workpiece 100 and two electrodes 900, 910 are intertwined with each other and electrically isolated from each other. In detail, the workpiece 100 and two electrodes 900, 910 are intertwined with each other but without contacting with each other.

A lattice structure of the electrode 910 may be the same as the lattice structure of the electrode 900, as described in FIG. 1, for example. The lattice structure of the body portion 110, the lattice structure of the electrode 900, and the lattice structure of the electrode 910 are parallel to each other along a longitudinal direction x that is perpendicular to a lateral direction Y and a vertical direction Z.

Figure 6:
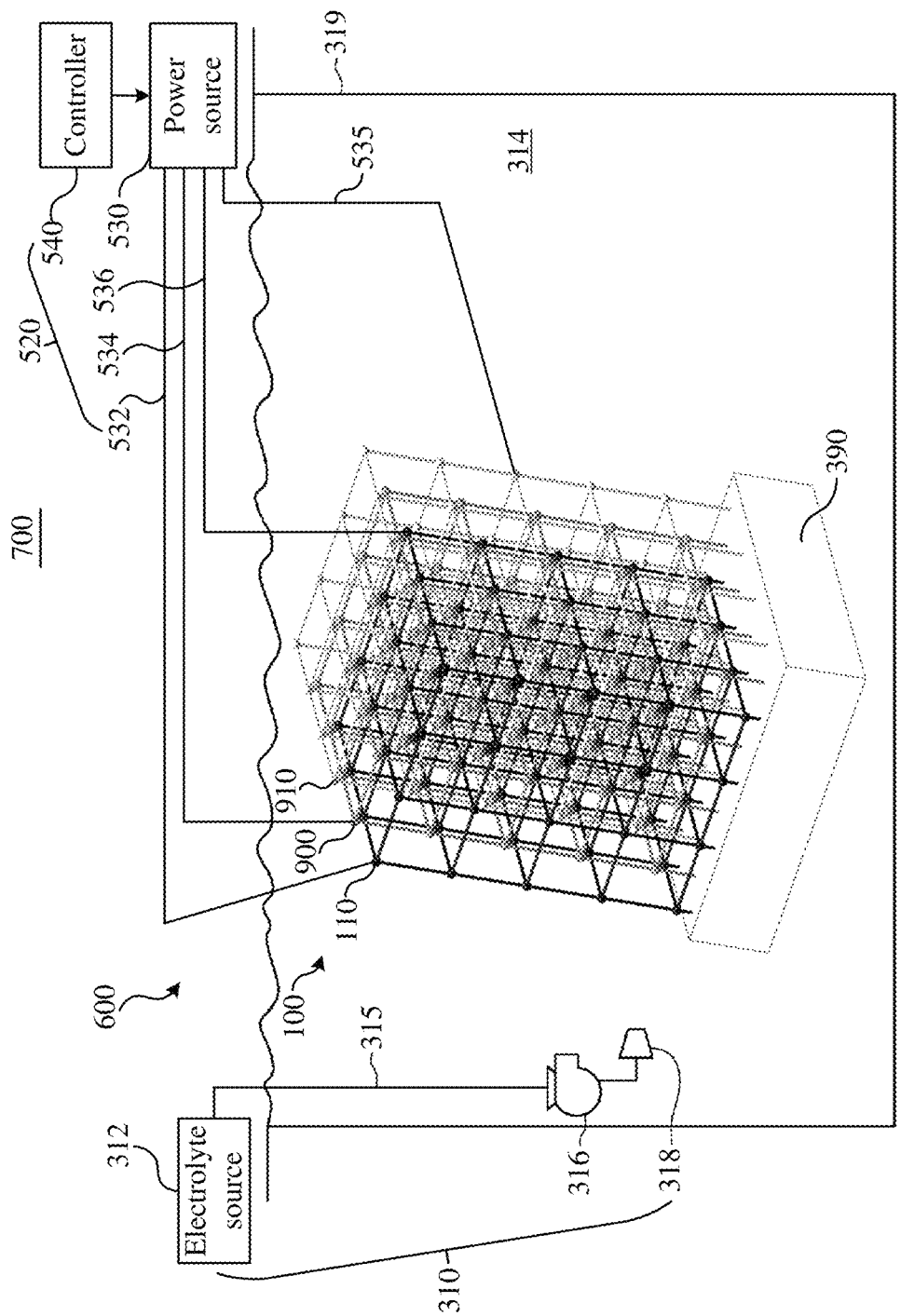
FIG. 6 is a schematic view of two electrodes and an ECM device of a system and the workpiece of FIG. 5 in accordance with a second exemplary embodiment.

FIG. 6 is a schematic view of two electrodes 900, 910 and an ECM device 600 of a system 700 and the workpiece 100 of FIG. 5 in accordance with a second exemplary embodiment. The ECM device 600 includes the electrolyte supply 310 and a power supply 520. Similar to FIG. 3, the container 319 of the electrolyte supply 310 is sized sufficiently to receive the electrolyte 314, the workpiece 100, two electrodes 900, 910, and the leads 532, 534, 535, and 536.

The power supply 520 includes a power source 530, two positive leads 532, 536; two negative leads 534, 535; and a controller 540. In the embodiment, the positive lead 532 is electrically coupled to the workpiece 100, the negative lead 534 is electrically coupled to the electrode 900; the positive lead 535 is electrically coupled to the electrode 910, the negative lead 536 is electrically coupled to the body portion 110 of the workpiece 100. In other embodiments, the positive lead 535 is electrically coupled to the electrode 910, the negative lead 536 is electrically coupled to the electrode 900.

The electrolyte 314 is circulated around and between the workpiece 100 and the electrodes 900, 910. The power source 530 is configured for being controlled by the controller 540 to apply the voltage, in the form of the pulsed voltage, between any two of the workpiece 100 and the electrodes 900, 910 to facilitate smoothing surfaces of the workpiece 100.

In a first embodiment, a polarity of the voltage between any two of the workpiece 100 and the electrodes 900, 910 is reversed to facilitate smoothing any one of the electrodes 900, 910. The voltage between the workpiece 100 and the electrode 900 and the voltage between the electrode 910 and the workpiece 100 are sequentially applied so as to facilitate smoothing surfaces of all of the workpiece 100 and the electrodes 900, 910. Therefore, when ECM is complete, all of the electrodes 900, 910 are smoothed and left in place as part of the workpiece 100.

In a second embodiment, a polarity of the voltage between any two of the workpiece 100 and the electrodes 900, 910 is reversed to at least partially dissolve any one of the electrodes 900, 910.

According to the first embodiment, the second embodiment, or a combination thereof, when ECM is complete, surfaces of one of the electrodes 900, 910 are smoothed, the other of the electrodes 900, 910 is removed, therefore one of the electrodes 900, 910 is left in place as part of the workpiece 100. Alternatively, when ECM is complete, all of the electrodes 900, 910 may be removed from the workpiece 100 for example.

In other embodiments, the workpiece 100 and a plurality n of electrodes (not shown) of lattice structures are intertwined with each other and are electrically isolated from each other, where n is an integer and n>3.

Figure 7:
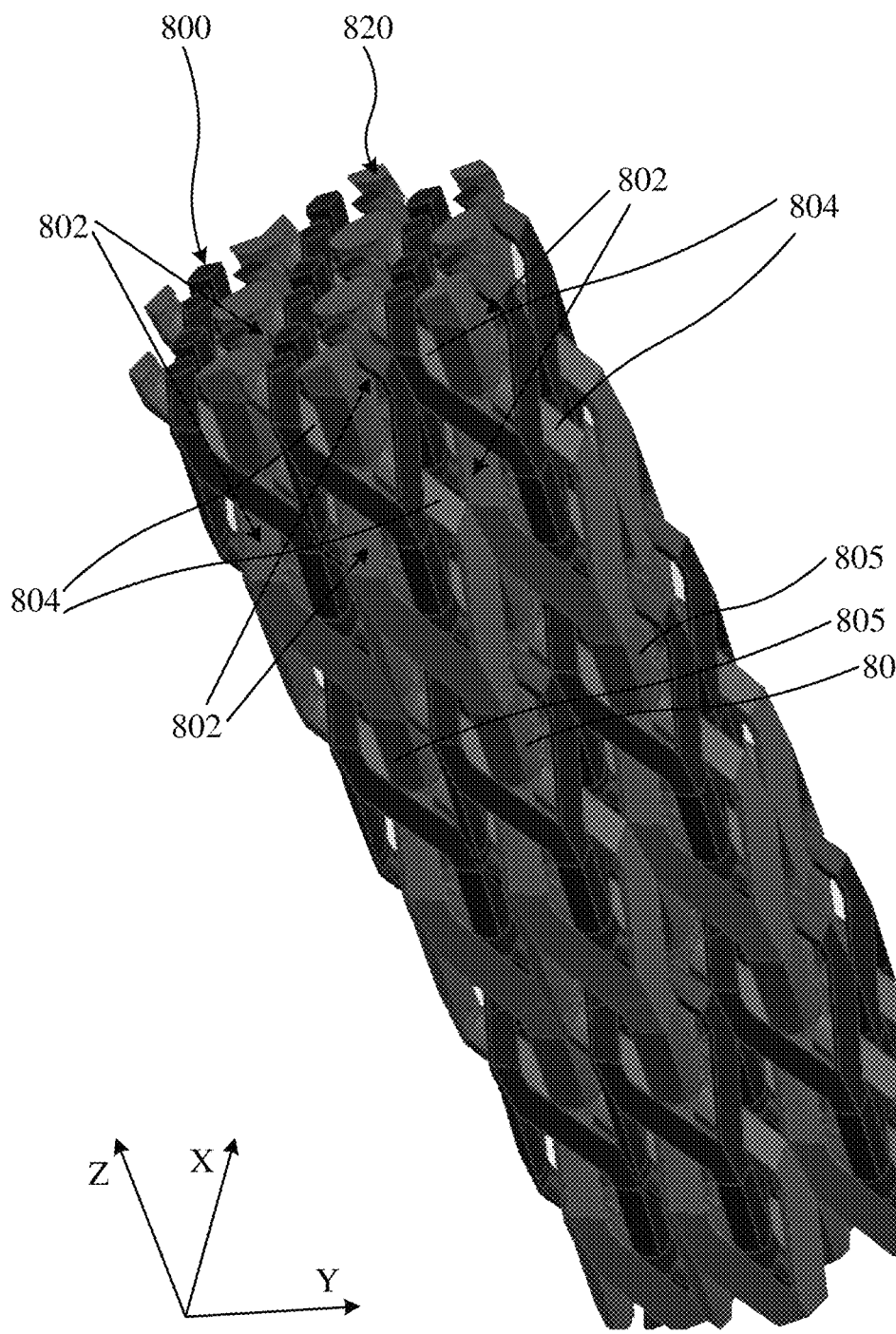
FIG. 7 is a perspective view of a workpiece of another lattice structure and an electrode.

FIG. 7 is a perspective view of a workpiece 800 of another lattice structure and an electrode 820. In the embodiment, the workpiece 800 and the electrode 820 may be formed by an additive manufacturing system 200 of FIG. 2 for example, intertwined with each other, and electrically isolated from each other. In detail, the workpiece 800 and the electrode 820 are intertwined with each other but without contacting each other. In other embodiments, the workpiece 800 and the electrode 820 may be formed by other methods rather than the additive manufacturing method.

The workpiece 800 has a lattice structure. In a non-limiting example, the workpiece 800 includes a plurality of first spaced apart diagonal rods 802 and a plurality of second spaced apart diagonal rods 804; the first spaced apart diagonal rods 802 and the second spaced apart diagonal rods 804 are interconnected on nodal points 805 to define the lattice structure.

In the embodiment, a lattice structure of the electrode 820 is the same as the lattice structure of the workpiece 800. The lattice structure of the workpiece 800 is parallel to the lattice structure of the electrode 820 along a longitudinal direction x that is perpendicular to a lateral direction Y and a vertical direction Z. In other embodiments, the lattice structure of the electrode 820 may be different from the lattice structure of the workpiece 800.

As described herein, the lattice structure of the workpiece 800 of FIG. 7 is different from the lattice structure of the workpiece 100 of FIG. 1. The lattice structure of the electrode 820 of FIG. 7 is different from the lattice structure of the electrode 900 of FIG. 1.

Figure 8:
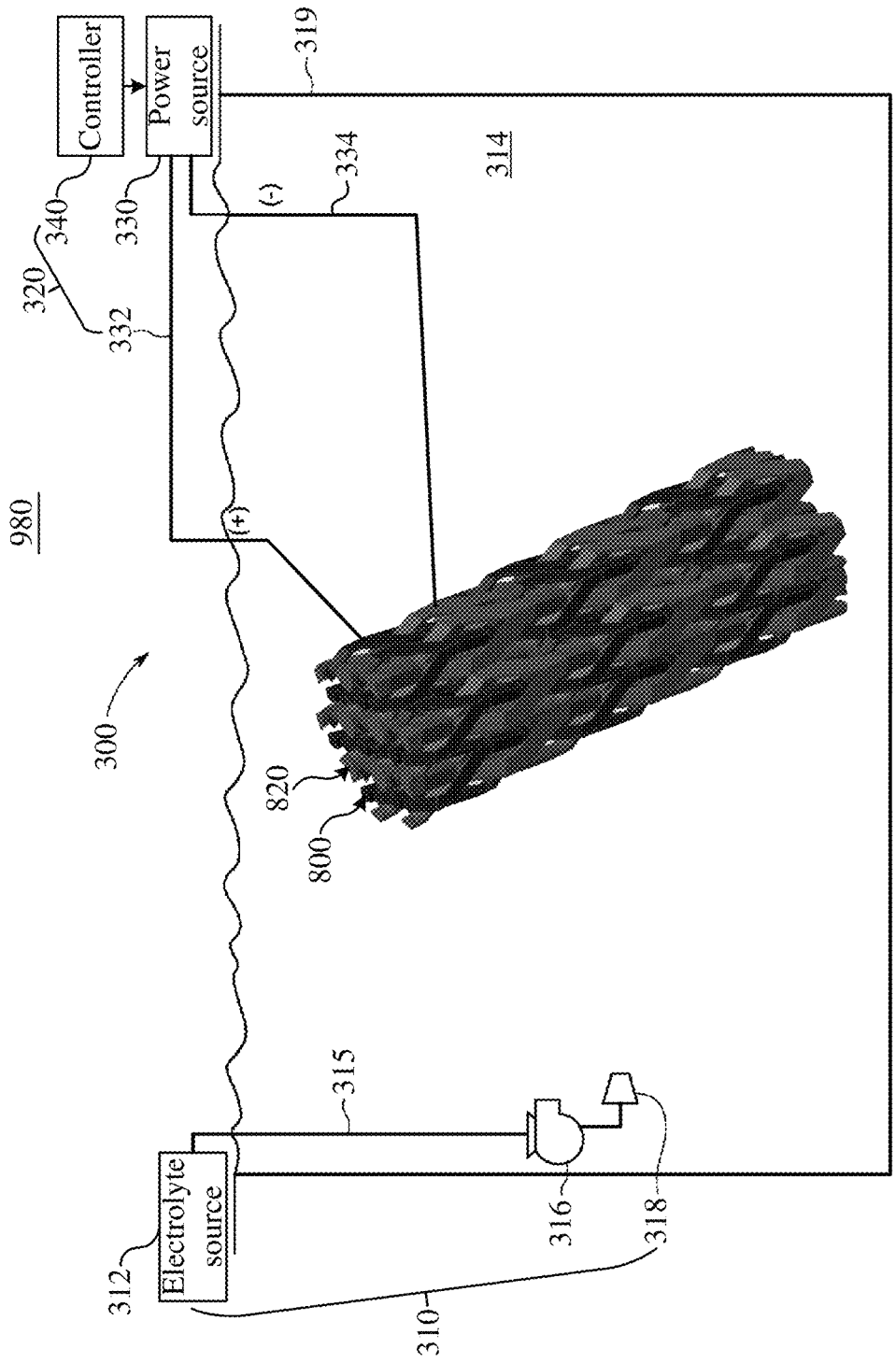
FIG. 8 is a schematic view of the electrode and an ECM device of a system and the workpiece of FIG. 7 in accordance with a third exemplary embodiment.

FIG. 8 is a schematic view of the electrode 820 and the ECM device 300 of a system 980 and the workpiece 800 of FIG. 7 in accordance with a third exemplary embodiment.

Similar to FIG. 3, the container 319 of the electrolyte supply 310 is sized sufficiently to receive the electrolyte 314, the workpiece 800, the electrode 820, and the leads 332, 334. The positive lead 332 is electrically coupled to the workpiece 800, the negative lead 334 is electrically coupled to the electrode 820.

In the exemplary embodiment, the electrolyte 314 is circulated around and between the workpiece 800 and the electrode 820. The power source 330 is configured for being controlled by the controller 340 to apply the voltage, in the form of the pulsed voltage, between the workpiece 800 and the electrode 820 to facilitate smoothing surfaces of the workpiece 800.

In one embodiment, a polarity of the voltage between the workpiece 800 and the electrode 820 is reversed to facilitate smoothing surfaces of the electrode 820. The polarity of the voltage may be switched at the determined high frequency.

In another embodiment, the polarity of the voltage between the workpiece 800 and the electrode 820 is reversed to at least partially dissolve the electrode 820.

In another exemplary embodiment, the workpiece 800 and a plurality of electrodes 820 (not shown) are intertwined with each other and electrically isolated from each other. In detail, the workpiece 800 and the electrodes 820 are intertwined with each other but without contacting each other.

Similar to FIG. 6, the electrolyte 314 is circulated around and between the workpiece 800 and the electrodes 820, the voltage, in the form of a pulsed voltage, is applied between any two of the workpiece 800 and the electrodes 820 to facilitate smoothing surfaces of the workpiece 800. In one embodiment, the electrolyte 314 may be supplied by the electrolyte source 310 of FIG. 6 for example, the voltage may be supplied by the power source 530 of FIG. 6 for example.

In a first embodiment, a polarity of the voltage between any two of the workpiece 800 and the electrodes 820 is reversed to facilitate smoothing any one of the electrodes 820. The workpiece 800 and the electrodes 820 are coupled in pairs to the power supply, for example the power supply 520 of FIG. 6, the voltage is sequentially applied to each pair of the workpiece 800 and the electrode 820 or each pair of the two electrodes 820 so as to facilitate smoothing surfaces of all of the workpiece 800 and the electrodes 820. Therefore, when ECM is complete, all of the electrodes 820 are smoothed and left in place as part of the workpiece 800.

In a second embodiment, a polarity of the voltage between any two of the workpiece 800 and the electrodes 820 is reversed to at least partially dissolve any one of the electrodes 820.

According to the first embodiment, the second embodiment, or a combination thereof, when ECM is complete, surfaces of some of the electrodes 820 are smoothed, the rest of the electrodes 820 are removed, therefore some of the electrodes 820 are left in place as part of the workpiece 800. Alternatively, when ECM is complete, all of the electrodes 820 may be removed from the workpiece 800 for example.

In yet another exemplary embodiment, each of a plurality of electrodes 820 (not shown) is intertwined with the workpiece 800, and is electrically isolated from the workpiece 800. Similar to FIG. 6, the electrolyte 314 is circulated around and between the workpiece 800 and the electrodes 820, the voltage, in the form of a pulsed voltage, is applied between the workpiece 800 and each of the electrodes 820, so as to facilitate smoothing surfaces of the workpiece 800. The voltage between the workpiece 800 and each of the electrodes 820 is reversed to at least partially dissolve each of the electrodes 820.

The embodiments of the present invention achieve weight reduction by replacing the bulk structure of the conventional workpiece, for example the solid-body workpiece, with the lattice structure of the workpiece 100 of FIG. 1 or the workpiece 100 of FIG. 5 or the workpiece 800 of FIG. 7. The surface roughness of the workpiece 100 or 800 may be removed by the ECM method, as described above.

Furthermore, the workpiece 100 or 800 may form a smaller lattice structure for example, the scale of the smaller lattice structure may be greater than or equal to 0.05 inch and may be smaller than 0.12 inch for example. More specifically, the scale of the smaller lattice structure may be greater than or equal to 0.001 inch and may be smaller than 0.12 inch for example. The technical advantage of the embodiments of the present invention is that the ECM method, as described above, can be applied to surface finish the smaller lattice structure of the workpiece 100 or 800. However, conventional surface finish methods may not be applied to the smaller lattice structure of the workpiece 100 or 800, that is, it may be very difficult or impossible to surface finish the smaller lattice structure of the workpiece 100 or 800 through conventional machining methods, such as grit blasting, grinding, sanding, polishing, etc.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure will not be limited to the particular embodiment disclosed as the best mode contemplated for carrying out this disclosure, but that the disclosure will include all embodiments falling within the scope of the appended claims.

The invention claimed is:

1. A system for machining a workpiece of a lattice structure, the system comprising:
   an electrode of a lattice structure, wherein the electrode and the workpiece are intertwined with each other and electrically isolated from each other; and
   an electrolyte supply for circulating an electrolyte around and between the workpiece and the electrode; and
   a power supply for applying a voltage between the workpiece and the electrode to facilitate smoothing surfaces of the workpiece.

2. The system of claim 1, wherein a polarity of the voltage is reversed to facilitate smoothing surfaces of the electrode.

3. The system of claim 2, wherein the polarity of the voltage is switched at a determined high frequency.

4. The system of claim 1, wherein a polarity of the voltage is reversed to at least partially dissolve the electrode.

5. The system of claim 1, wherein the system comprises:
   a plurality of electrodes of lattice structures, wherein each of the electrodes and the workpiece are intertwined with each other and electrically isolated from each other;
   wherein the electrolyte supply is configured for circulating the electrolyte around and between the workpiece and each of the electrodes; and
   wherein the power supply is configured for applying the voltage between the workpiece and each of the electrodes to facilitate smoothing surfaces of the workpiece.

6. The system of claim 5, wherein a polarity of the voltage between the workpiece and each of the electrodes is reversed to at least partially dissolve each of the electrodes.

7. The system of claim 1, wherein the system comprises:
a plurality of electrodes of lattice structures, wherein the electrodes and the workpiece are intertwined with each other and electrically isolated from each other;
wherein the electrolyte supply is configured for circulating the electrolyte around and between the workpiece and the electrodes; and
wherein the power supply is configured for applying the voltage between any two of the workpiece and the electrodes to facilitate smoothing surfaces of the workpiece.

8. The system of claim 7, wherein a polarity of the voltage between any two of the workpiece and the electrodes is reversed to facilitate smoothing surfaces of any one of the electrodes.

9. The system of claim 7, wherein a polarity of the voltage between any two of the workpiece and the electrodes is reversed to at least partially dissolve any one of the electrodes.

10. The system of claim 8, wherein the workpiece and the electrodes are coupled in pairs to the power supply, the voltage is sequentially applied to each pair of the workpiece and the electrode or each pair of the two electrodes so as to facilitate smoothing surfaces of all of the workpiece and the electrodes.

11. The system of claim 2, wherein cathode reactions are configured to optimize oxygen evolution to speed up anodic reactions when the polarity of the voltage is switched, the oxygen evolution is configured to enhance electrochemical machining of the workpiece.

12. A method for machining a workpiece of a lattice structure, the method comprising:
providing an electrode of a lattice structure to be intertwined with the workpiece and be electrically isolated from the workpiece;
circulating an electrolyte around and between the workpiece and the electrode; and
applying a voltage between the workpiece and the electrode to facilitate smoothing surfaces of the workpiece.

13. The method of claim 12, further comprising:
reversing a polarity of the voltage to facilitate smoothing surfaces of the electrode.

14. The method of claim 12, further comprising:
reversing a polarity of the voltage to at least partially dissolve the electrode.

15. The method of claim 12, further comprising:
providing a plurality of electrodes of lattice structures, wherein each of the electrodes and the workpiece are intertwined with each other and electrically isolated from each other;
circulating the electrolyte around and between the workpiece and each of the electrodes; and
applying the voltage between the workpiece and each of the electrodes to facilitate smoothing surfaces of the workpiece.

16. The method of claim 15, further comprising:
reversing a polarity of the voltage between the workpiece and each of the electrodes to at least partially dissolve each of the electrodes.

17. The method of claim 12, further comprising:
providing a plurality of electrodes of lattice structures, wherein the electrodes and the workpiece are intertwined with each other and electrically isolated from each other;
circulating the electrolyte around and between the workpiece and the electrodes; and
applying the voltage between any two of the workpiece and the electrodes to facilitate smoothing surfaces of the workpiece.

18. The method of claim 17, further comprising:
reversing a polarity of the voltage between any two of the workpiece and the electrodes to facilitate smoothing surfaces of any one of the electrodes.

19. The method of claim 17, further comprising:
reversing a polarity of the voltage between any two of the workpiece and the electrodes to facilitate smoothing surfaces of any one of the electrodes.

* * * * *